May 7, 1940.   L. MARTON   2,200,095
PHOTOGRAPHIC DEVICE FOR VACUUM APPARATUS
Filed Feb. 28, 1939   3 Sheets-Sheet 1

Inventor
Ladislaus Marton
By
Attorney

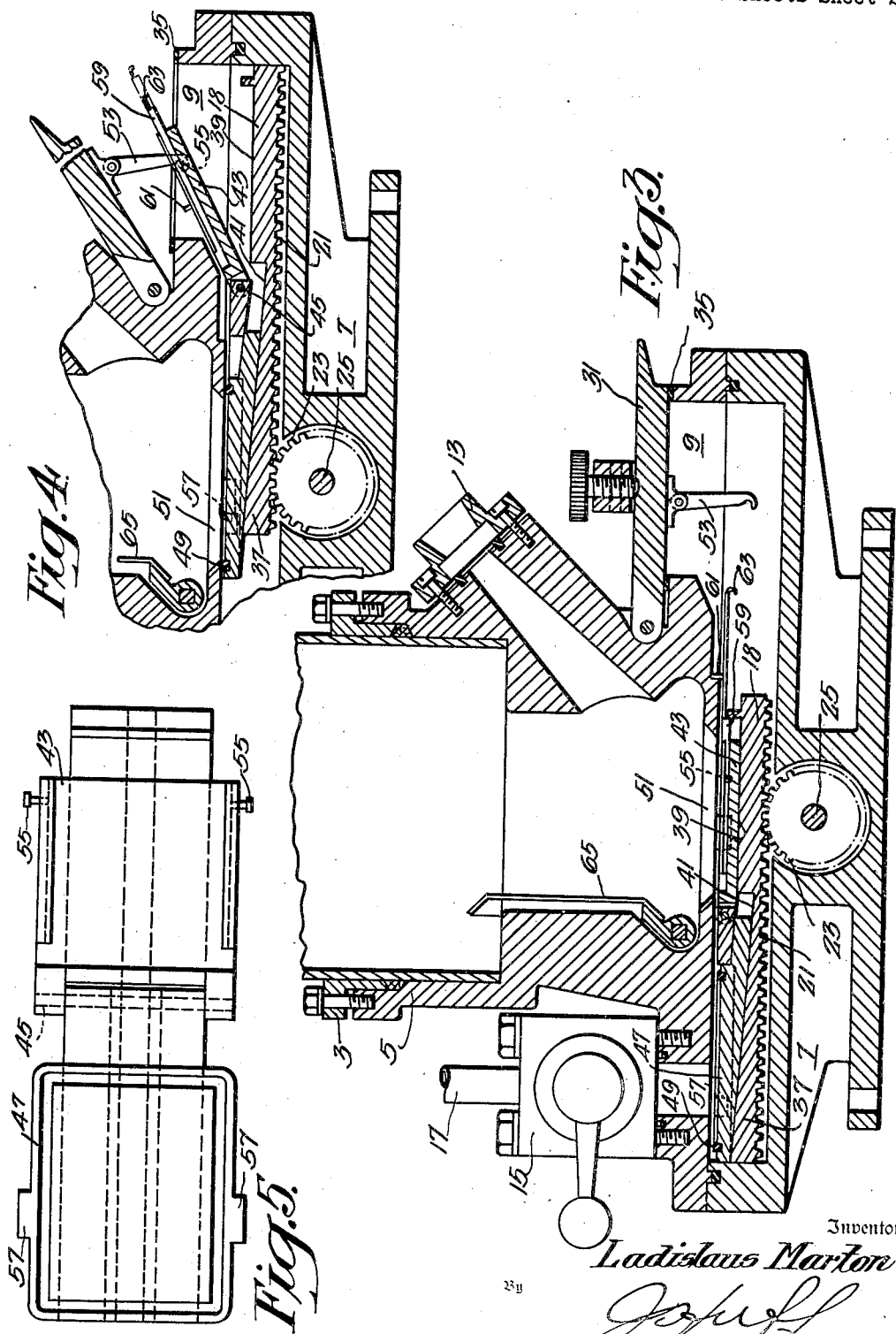

May 7, 1940.  L. MARTON  2,200,095
PHOTOGRAPHIC DEVICE FOR VACUUM APPARATUS
Filed Feb. 28, 1939  3 Sheets-Sheet 3
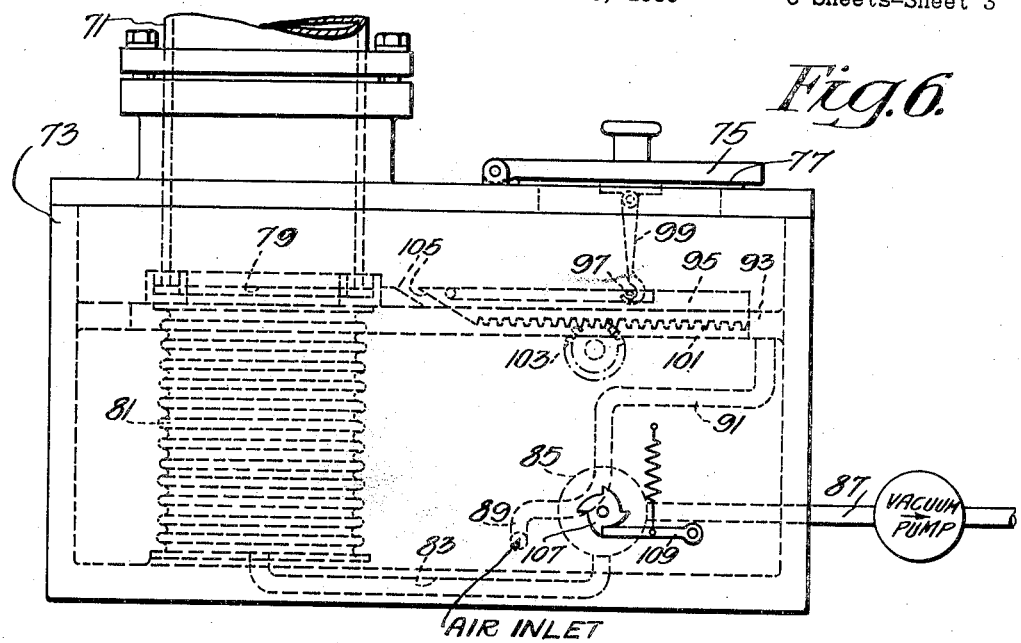
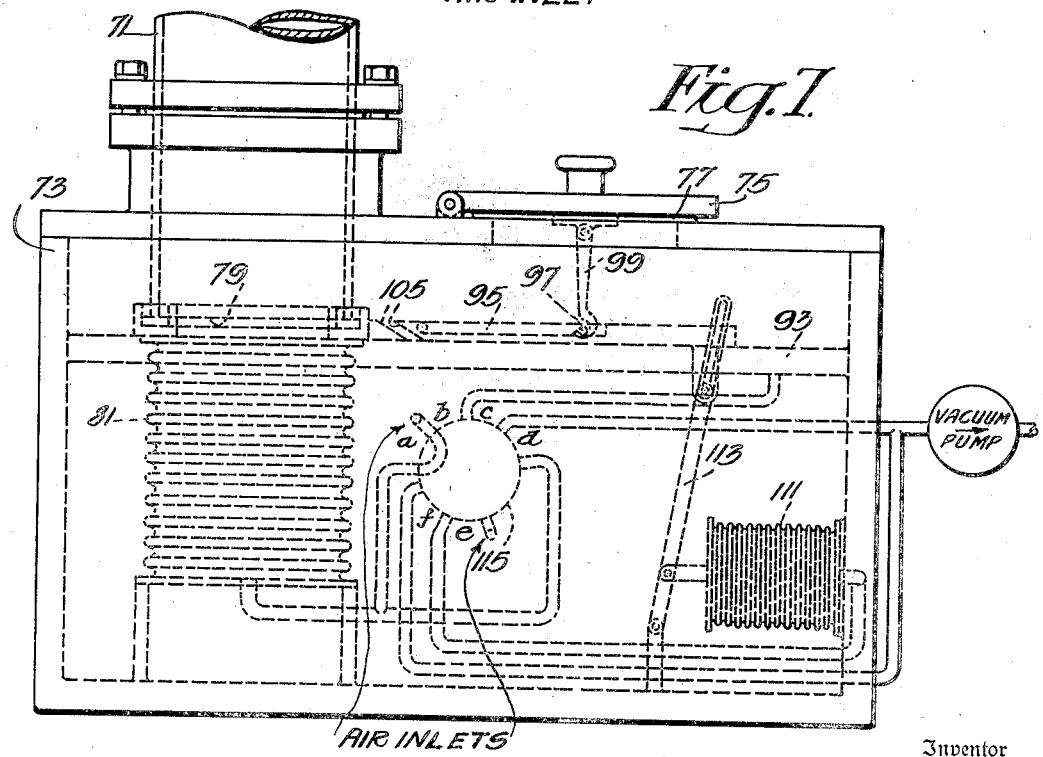
Inventor
Ladislaus Marton
By
Attorney Patented May 7, 1940

2,200,095

UNITED STATES PATENT OFFICE 2,200,095

PHOTOGRAPHIC DEVICE FOR VACUUM APPARATUS

Ladislaus Marton, Collingswood, N. J., assignor to Radio Corporation of America, a corporation of Delaware Application February 28, 1939, Serial No. 258,887

20 Claims. (Cl. 250—66)

This invention relates to a device for inserting and removing photographic plates in a vacuum apparatus and more especially to means for viewing or photographing the image in an electron microscope.

In an electron microscope and other vacuum apparatus, it is often desirable to view the image of the specimen and to photograph such image. Since the photographing must take place within a vacuum, the means for introducing photographic plates is necessarily somewhat involved. In view of the fact that the electron microscope occupies a substantial volume and that the evacuation of the microscope requires a substantial amount of time, it is desirable to provide means whereby the photographic device may be inserted without losing the vacuum.

One of the objects of this invention is to provide means for inserting photographic plates into a vacuum apparatus. Another object is to provide means whereby the operator of the vacuum apparatus may either view or photograph an image. A further object is to provide means for inserting photographic plates in a chamber which may be shut off from the main portion of a vacuum apparatus so that the main vacuum may be maintained. A still further object is to provide means whereby electron images may be viewed or photographed without disturbing the main vacuum of an electron microscope.

Figure 2:
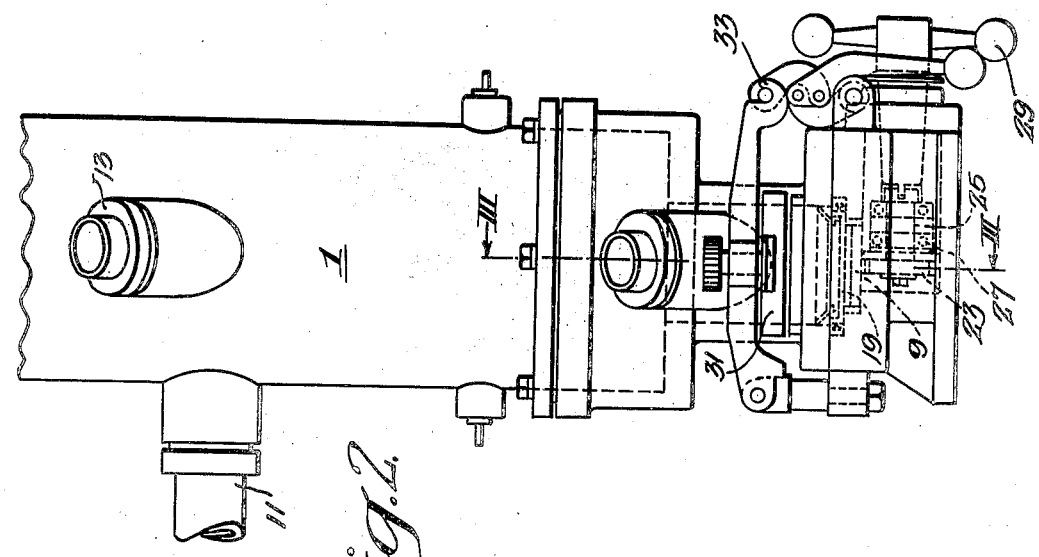
Figure 1:
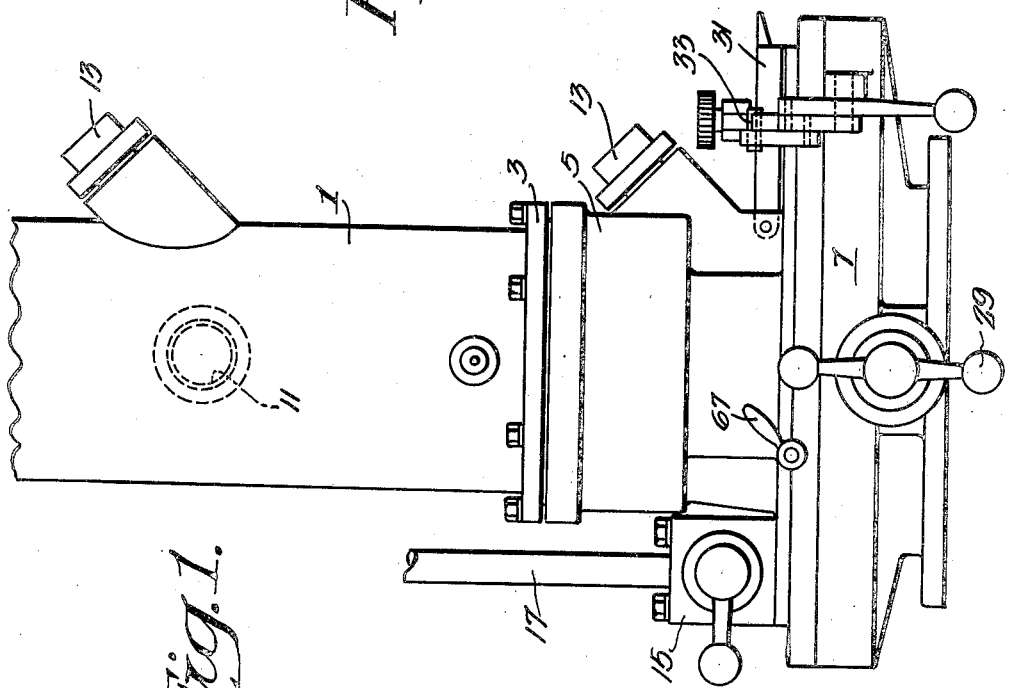

The invention will be described by reference to the accompanying drawings, in which Figures 1 and 2 are front and side elevational views of one embodiment of the invention; Figures 3 and 4 are sectional views taken along the line III—III of the auxiliary chamber of an electron microscope in two operating positions; Figure 5 is a view of the carriage which includes the photographic plate holder support and the door which shuts off the main chamber of the microscope; and Figures 6 and 7 represent modifications of the invention.

Referring to Figs. 1, 2, 3 and 4, the main chamber 1 of an electron microscope or other vacuum apparatus is suitably mounted by means of a thrust collar 3 upon the upper portion 5 of a base 7 which includes an auxiliary chamber 9 which will be hereinafter described. The main chamber is connected to a vacuum pump by means of a suitable fitting 11. One or more viewing windows 13 may be inserted in the main chamber.

The auxiliary chamber 9 is connected through a valve 15 and a pipe 17 to a vacuum pump, not shown. A carriage 18 is mounted within the auxiliary chamber on guides 19. The carriage is moved back and forth by means of a rack 21 and a pinion 23. The pinion is mounted on a shaft 25 which may be supported by ball bearings 27, or the like. The pinion shaft is suitably coupled to a control handle 29 by means of which the carriage is moved back and forth within the chamber. A door 31 is mounted on the auxiliary chamber through which the photographic plate holders are inserted. The door is held in place by a suitable latch 33 which clamps the door against vacuum-tight gaskets 35.

The details of the auxiliary chamber and the carriage are best described by reference to Figs. 3, 4 and 5. The carriage 17 is comprised of a lower portion 37, which has a plane face 39 and a sloping face 41. A photographic plate holder support 43 is pivotally mounted 45 on the plane face of the carriage and a slidable door or cover 47 is mounted on the sloping face. The door includes a gasket 49 which engages the edges of an opening 51 which connects with the main chamber of the microscope.

The door 31 may include a hook-like member 53 which engages projecting pins 55 on the photographic plate holder support so that the support may be raised when the door is lifted, as shown in Fig. 4. The door which shuts off the main chamber of the microscope is provided with projections 57 which engage stops which are a part of the guide 19.

The operation of inserting photographic plates is as follows: Referring to Fig. 3, it will be seen that the door 31 is closed. In this position, the auxiliary chamber may be evacuated by connecting the chamber to the vacuum pump. If the handle 29 is turned in a clockwise direction, the carriage 17 will be moved to the right, carrying with it the door 47. The projections 57 will engage stops which arrest the movement of the door when it is coaxial with the opening 51. In this position, the carriage 17 continues to move to the right, thereby driving the door 47 upwardly until the gasket 49 tightly engages the edges of the opening and thereby seals the main chamber of the microscope.

The valve 15 is next moved so that the auxiliary chamber is no longer connected to the vacuum pump and is connected to admit air into the auxiliary chamber. If the door 31 is now raised, the hook 53 will engage the pins 55 and thereby lift the photographic plate holder support 43, as shown in Fig. 4. A photographic plate holder 59 is shown partly inserted in the support in the broken line portion of the drawing. The plate holder is completely inserted with the conventional plate holder cover in position. The door may now be closed and locked and the valve 15 turned so that the auxiliary chamber is once more evacuated. After the evacuation has been completed, the handle 29 is turned in a counter-clockwise direction, thereby permitting the door 47 to drop away from the opening 51 and thus carried to the extreme left-hand position, as shown in Fig. 3. As the carriage moves into this position, a projection 61 on the cover of the plate holder engages a stop which withdraws the cover 63 and permits the plate to be exposed to the electron image.

If the operator prefers to view the image immediately before exposing the photographic plate, a fluorescent screen 65 may be turned by means of the lever 67 to thereby expose the screen to the image. After the image has been photographed, the carriage is again conveyed to the right. As the carriage is moved in this direction, the cover 63 of the plate holder is moved to its original position by means of a suitable stop. This completes the cycle of operation and the plate holder may be removed by lifting the door 31. It should be understood that the surface of the door 47 may be coated with a fluorescent material so that the image may be viewed without using the auxiliary screen 65.

In a modification of the device, the door or cover which closes off the main chamber of the microscope is operated by a bellows. This modification is shown in Fig. 6. The lower portion of the main chamber 71 is suitably mounted on a base 73. The base includes a door 75 which engages a gasket 77 whereby the inner portion of the base may be made vacuum tight. The door may be clamped in its closed position by a suitable lock not shown. The door 79 which closes off the main chamber of the microscope is mounted on a bellows 81. The bellows is connected by a pipe or conduit 83 to a four-position valve 85. One of the connections 87 to the valve is terminated in a vacuum pump not shown. Another connection 89 is an air inlet which may be at atmospheric or higher than atmospheric pressure. The fourth connection 91 is a pipe which is terminated within the auxiliary chamber in the base 73.

A suitable track 93 is arranged to guide a photographic plate holder support 95 which is hinged. The plate holder support includes pins 97 which are engaged by a hook 99 so that raising of the door 75 raises the plate holder support as shown by the broken lines of the drawings. The lower portion of the plate holder support includes a rack 101 which engages a pinion 103. The pinion is connected to a handle which is external to the chamber and is not shown. The adjacent portions of the support 95 and the door 79 are bevelled in opposite directions 105.

The operation is as follows: The four-way valve is first positioned so that air is admitted to the bellows 81, thereby driving the door 79 upwardly so that a vacuum tight joint is formed between the lower portion of the microscope chamber 71 and the door. The valve is then turned to its second position in which air is admitted into the auxiliary chamber. This permits the operator to raise the door 75 and insert a photographic plate holder. The door is then locked in the closed position and the valve 85 turned so that the auxiliary chamber is connected to the vacuum pump.

After the chamber has been evacuated, the valve 85 is turned to its fourth position. In this position, the vacuum pump is connected to the bellows 81 so that the bellows may be evacuated. The evacuation of the bellows releases the pressure on the door 79 so that it will be lowered by its own weight, thereby permitting the plate holder to be moved to the left into position for exposing the photographic plate. In the event that the door 79 does not drop by its weight, the sloping portions 105 of the door and support 95 will engage, thereby driving the door downwardly.

It should be understood that the cover of the photographic plate holder may be moved back and forth by suitable stops which have already been described and illustrated in Figs. 3 and 4. It should also be understood that the valve 85 is controlled by a handle which is arranged on the outside of the base 73. The valve may include a ratchet 107 and a pawl 109 which prevent improper operation of the several cycles of the device.

Fig. 7 is not unlike the modification just described. The essential difference is that a second bellows 111 and a lever 113 are substituted for the rack and pinion. The second bellows 111 is operated by arranging a six-position valve 115 so that the cycles of operation are as follows: In the position $a$, air is admitted into the first bellows so that the main chamber of the microscope is made vacuum tight. In the second valve position $b$, air is admitted into the auxiliary chamber. While the valve is in this position, the plate holder is inserted. In the third position $c$, the auxiliary chamber is evacuated. In the fourth position $d$, the first bellows is evacuated, so that the door engaging the main chamber of the microscope is released so that it may be moved downwardly. In the fifth position $e$, air is admitted into the second bellows, whereby the plate holder support is moved to the left. During this movement, the cover of the plate holder may be partially withdrawn. In the final valve position $f$, the second bellows is evacuated, thereby moving the plate holder support back into its original position.

It should be understood that in the event the vacuum in the bellows is insufficient to cause the desired movement of either the doors or plate holder support, a second bellows may be used so that pressure may be applied. By suitable modifications, the system may be arranged so that fluids may be employed to operate the bellows. In either case, the practical arrangement of the valve may be modified, as, for example, the valve may consist of elements arranged in parallel rows instead of in a single row, which has been shown for simplicity.

Thus, the invention has been described as a device by means of which a photographic plate holder may be readily inserted within a vacuum apparatus, for example, an electron microscope, without impairing the main vacuum. The door or plate which shuts off the main chamber of the microscope during the insertion of a plate holder may include a fluorescent screen in which the image of the specimen may be viewed. It is preferable to make the interior of the auxiliary chamber as small as possible to limit the amount of additional pumping. The cycle of operations may be fixed by a ratchet or the equivalent.

I claim as my invention:

1. In a vacuum apparatus, a main chamber, an auxiliary chamber, an opening connecting said chambers, a vacuum-tight door for closing said opening so that said chambers will separately support a vacuum, a photographic plate holder support, means for moving said door with respect to said opening, means for moving said support with respect to said opening, and means for evacuating said auxiliary chamber.

2. In a vacuum apparatus, a main chamber, an auxiliary chamber, an opening connecting said chambers, a vacuum tight door for said opening, a photographic plate holder support, means external to said chambers and connected to said door within said auxiliary chamber for moving said door with respect to said opening, means for moving said support to said opening, and means for evacuating or admitting air into said auxiliary chamber.

3. In a vacuum apparatus, a main chamber, an auxiliary chamber, an opening connecting said chambers, a door for closing said opening, a photographic plate holder support, a carriage having a sloping face for carrying said door and a plane face for carrying said support, and means for moving said carriage so that said door and said support are successively aligned with said opening.

4. In a vacuum apparatus, a main chamber, an auxiliary chamber, an opening connecting said chambers, a door for closing said opening, a photographic plate holder support, a carriage having a sloping face for carrying said door and a plane face for carrying said support, means for moving said carriage so that said door and said support are alternately aligned with said opening, and means for establishing a vacuum-tight connection between said door and said opening.

5. In a device of the character of claim 4, means for evacuating said auxiliary chamber when said door establishes said vacuum-tight connection.

6. In a vacuum apparatus, a main chamber, an auxiliary chamber, an opening connecting said chambers, a cover for said opening, a photographic plate holder support, a carriage including a sloping face for carrying said cover and a plane face for carrying said plate holder support means for engaging said cover so that it is moved with respect to said sloping face and with respect to said opening, and means for moving said carriage so that said cover and said plate holder support may be aligned successively with said opening.

7. In a device of the character of claim 6, means for admitting air and evacuating said auxiliary chamber, and means for inserting a photographic plate holder when air is admitted into said auxiliary chamber.

8. In a device of the character of claim 6, means for admitting air and evacuating said auxiliary chamber, means for inserting a photographic plate holder when air is admitted into said auxiliary chamber, and means for partially uncovering said plate holder when said support is aligned with said opening and for recovering said plate holder before it is withdrawn from said alignment.

9. In a vacuum apparatus, a main chamber, an auxiliary chamber, an opening connecting said chambers, a cover for closing said opening, a bellows for operating said cover, a photographic plate holder support, means for moving said support into alignment with said opening, and means for evacuating said auxiliary chamber.

10. In a vacuum apparatus, a main chamber, an auxiliary chamber, an opening connecting said chambers, a cover for closing said opening, a bellows for operating said cover, a photographic plate holder support, means for moving said support into alignment with said opening, and a four-way valve including connections to said auxiliary chamber, to an air source, to a vacuum pump and to said bellows so that the bellows may be expanded and retracted and so that the auxiliary chamber may be evacuated and operated at pressures higher than said vacuum.

11. In a vacuum apparatus, a main chamber, an auxiliary chamber, an opening connecting said chambers, a cover for closing said opening, means for operating said cover, a photographic plate holder support, means for moving said support into alignment with said opening, and a valve including connections to an air source, to a vacuum source, to said chamber and to said cover operating means whereby said valve controls the cover position and the pressure within said auxiliary chamber.

12. In a vacuum apparatus, a main chamber, an auxiliary chamber, an opening connecting said chambers, a cover for closing said opening, means for operating said cover, a photographic plate holder support, means for moving said support into alignment with said opening, and a valve including connection to an air source, to a vacuum source, to said cover operating means, to said auxiliary chamber, and to said support moving means so that said valve controls the operation of said means and the pressures within said auxiliary chamber.

13. In a vacuum apparatus, a main chamber, an auxiliary chamber, an opening connecting said chambers, a cover for closing said opening, a bellows for controlling said closing, a photographic plate holder support, a second bellows for moving said support with respect to said opening, and means for controlling the operation of said first mentioned and said second bellows and the pressure within said auxiliary chamber.

14. In a vacuum apparatus, a main chamber, an auxiliary chamber, an opening connecting said chambers, a cover for closing said opening, means for moving said cover into or out of engagement with said opening, a photographic plate holder support movable with respect to said opening, means for effecting said movement, and a six-way valve including connections to said cover moving means, to said support moving means, to an air source, to said auxiliary chamber, and to a vacuum source whereby said cover may be operated, said plate holder support moved, and the pressure within said auxiliary chamber controlled.

15. In a vacuum apparatus, a main chamber, an auxiliary chamber, an opening connecting said chambers, a vacuum-tight door for closing said opening so that said chambers will separately support a vacuum, a photographic plate holder support, means for moving said door with respect to said opening, means for moving said support with respect to said opening, means for evacuating said auxiliary chamber, and a second door mounted on said auxiliary chamber for the insertion of photographic plate holders.

16. In a vacuum apparatus, a main chamber, an auxiliary chamber, an opening connecting said chambers, a vacuum-tight door for closing said opening so that said chambers will separately support a vacuum, a photographic plate holder support, means for moving said door with respect to said opening, means for moving said support with respect to said opening, means for evacuating said auxiliary chamber, a second door mounted on said auxiliary chamber, and means secured to said second door for engaging said plate holder support so that said support may be moved with said door.

17. In an apparatus of the character of claim 1, a common means for controlling the operation of said door moving means and said support moving means.

18. In an apparatus of the character of claim 1, a common means for controlling the operation of said door moving means and said evacuating means.

19. In an apparatus of the character of claim 1, a common means for controlling the operation of said support moving means and said evacuating means.

20. In an apparatus of the character of claim 1, a common means for controlling the operation of said door moving means, said support moving means, and said evacuating means.

LADISLAUS MARTON.